United States Patent [19]

Chan et al.

[11] Patent Number: 5,618,162
[45] Date of Patent: Apr. 8, 1997

[54] CENTRIFUGAL COMPRESSOR HUB CONTAINMENT ASSEMBLY

[75] Inventors: Chi F. Chan, Mesa; Steven J. Pringnitz, Gilbert, both of Ariz.

[73] Assignee: AlliedSignal Inc., Morris Township, N.J.

[21] Appl. No.: 699,293

[22] Filed: Aug. 19, 1996

Related U.S. Application Data

[62] Division of Ser. No. 595,889, Feb. 6, 1996, which is a division of Ser. No. 362,069, Dec. 21, 1994.

[51] Int. Cl.⁶ ................................................. F04D 29/44
[52] U.S. Cl. ................................ 415/206; 415/224.5
[58] Field of Search .......................... 415/208.1, 208.2, 415/208.3, 214.1, 224.5

[56] References Cited

U.S. PATENT DOCUMENTS

| | | | |
|---|---|---|---|
| 3,167,301 | 1/1965 | Whitaker | 415/177 |
| 3,623,318 | 11/1971 | Shank | 415/208.3 |
| 4,181,466 | 1/1980 | Owen | 415/224.5 |
| 4,182,117 | 1/1980 | Exley et al. | 415/208.3 |
| 4,277,222 | 7/1981 | Barbeau | 415/177 |
| 4,709,546 | 12/1987 | Weiler | 415/116 |
| 4,761,947 | 8/1988 | Hennecke et al. | 415/115 |
| 5,062,262 | 11/1991 | Shekleton et al. | 415/115 |
| 5,090,868 | 2/1992 | Mosure et al. | 415/224.5 |
| 5,161,945 | 11/1992 | Clevenger et al. | 415/178 |
| 5,233,824 | 8/1993 | Clevenger | 415/178 |
| 5,235,803 | 8/1993 | Rodgers | 415/182.1 |
| 5,403,150 | 4/1995 | McEachern, Jr. et al. | 415/177 |

*Primary Examiner*—John T. Kwon
*Attorney, Agent, or Firm*—Jerry J. Holden; James W. McFarland

[57] ABSTRACT

To contain high energy fragments generated by a hub burst, a compressor containment assembly in a gas turbine engine includes a diffuser housing having an arcuate portion that defines a channel which traps the high energy fragments and an axial facing U-shaped which imparts flexibility. The assembly also includes a concave back shroud having a series of grooves that create resistance for the fragments as they slide along its surface. At its radial outer end the back shroud has an annular rim that absorbs some of the energy and delays the shearing of bolts. A bumper is disposed between the back shroud and a turbine wheel to limit the deflection of the back shroud during a hub burst.

6 Claims, 1 Drawing Sheet

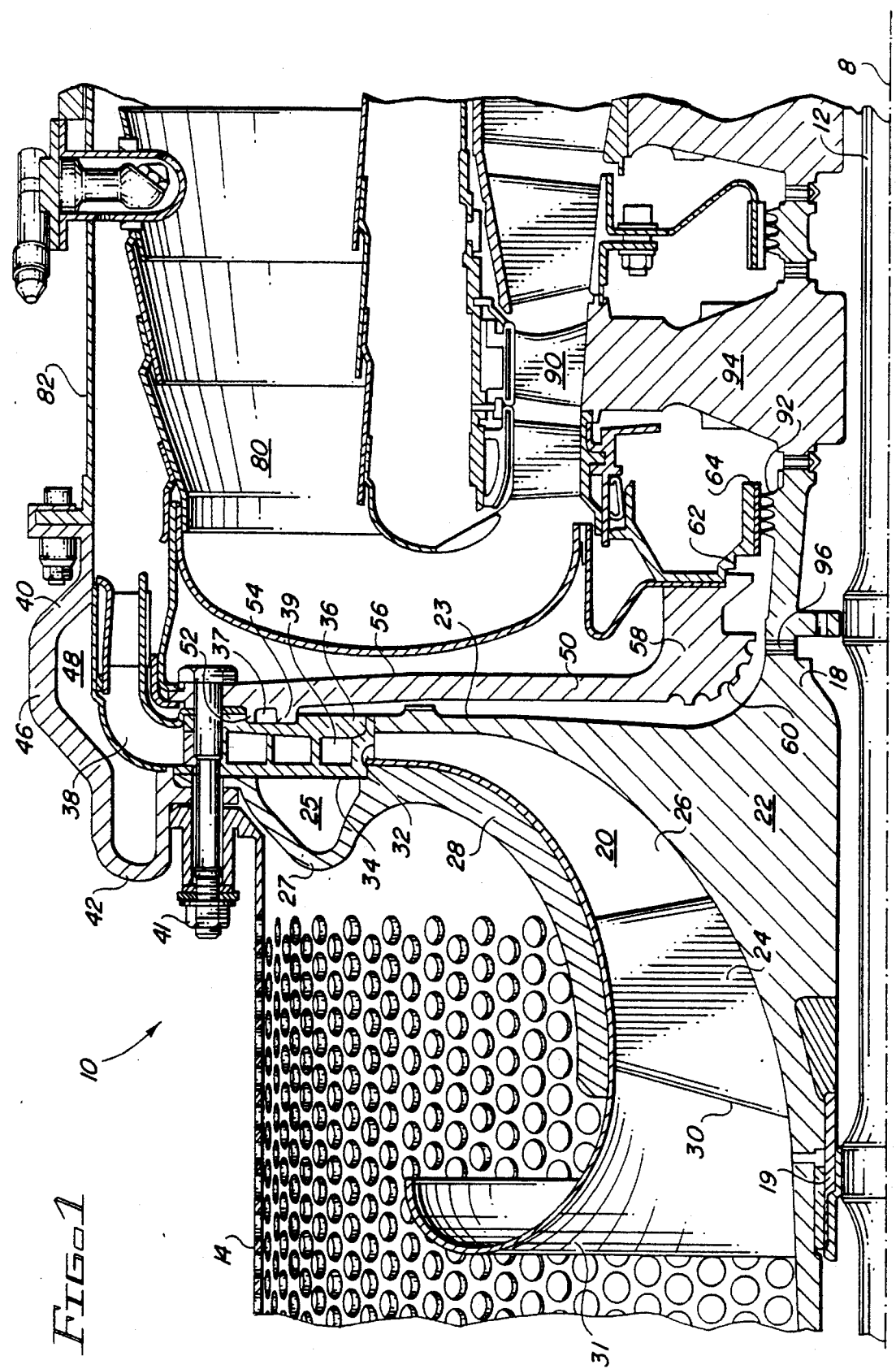

CENTRIFUGAL COMPRESSOR HUB CONTAINMENT ASSEMBLY

This application is a division of application Ser. No. 08/595,889, filed Feb. 6, 1996 which is a division of application Ser. No. 08/362,069, filed Dec. 21, 1994.

TECHNICAL FIELD

This invention relates generally to centrifugal compressors for gas turbine engines, and in particular to a containment assembly for containing within the engine, high energy fragments produced during compressor disintegration.

BACKGROUND OF THE INVENTION

Small gas turbine engines, often referred to as Auxiliary Power Units, are mounted aboard many types of aircraft to supply pressurized air for environmental control systems and main engine starting as well as shaft horsepower to drive accessories such as electric generators or hydraulic pumps. These engines include in flow series arrangement of a compressor, a combustor, and a turbine. The turbine drives the compressor through a rotating shaft. To keep these engine lightweight and small without sacrificing power it is necessary to operate the compressor at very high speeds, typically in excess of 40,000 rpm. Though a rare occurrence, these compressors sometimes disintegrate spewing out high energy fragments. Should these fragments escape from the engine they can seriously damage the aircraft. Accordingly, engine designers are always striving to develop better containment assemblies for containing the high energy fragments.

SUMMARY OF THE INVENTION

An object of the present invention is to provide a compressor hub containment assembly that can contain the high energy fragments generated during a hub burst.

The present invention achieves the above-stated objectives by providing a containment assembly that includes a diffuser housing having an arcuate portion that defines a channel which traps the high energy fragments and an axial facing U-shaped which imparts flexibility. The assembly also includes a concave back shroud having a series of grooves that create resistance for the fragments as they slide along its surface. At its radial outer end the back shroud has an annular rim that absorbs some of the energy and delays the shearing of bolts. A bumper is disposed between the back shroud and a turbine wheel to limit the deflection of the back shroud during a hub burst.

These and other objects, features and advantages of the present invention, are specifically set forth in, or will become apparent from, the following detailed description of a preferred embodiment of the invention then read in conjunction with the accompanying drawings.

BRIEF DESCRIPTION OF THE DRAWING

FIG. 1 is a cross-sectional view of a portion of a gas turbine engine with a centrifugal compressor and a containment assembly contemplated by the present invention.

DESCRIPTION OF THE PREFERRED EMBODIMENT

FIG. 1 shows a cross-section of a gas turbine engine generally denoted by the reference numeral 10 in which the engine components are axisymmetric about the engine centerline 8. The gas turbine engine 10 is comprised in flow series arrangement of a centrifugal compressor 20, a combustor 80, and a turbine 90 operatively coupled to the compressor 20 via a rotatable shaft 12. Air enters the engine 10 through an inlet 14, is pressurized in the compressor 20, and then mixed with fuel and ignited in the combustor 80 to form a hot, pressurized gas. This gas is then expanded across the turbine 90 to supply the work to drive the compressor 20 and any other accessories that are mounted to the engine 10.

The compressor 20 includes an centrifugal hub 22 which at one axial end 19 is splined to the shaft 12. At its opposite axial end 18, a curvic coupling 96 couples the hub 22 to a labyrinth seal 92 which is mounted for rotation to the shaft 12. Extending from the hub 22 are a plurality of circumferentially spaced apart impeller blades 24 and a plurality of splitter blades 26. Each of the splitter blades 26 is disposed between two of the impeller blades 24. The hub 22 and blades 24 and 26, are collectively referred to as an impeller. The impeller is disposed within the engine 10 between a front shroud 28, and a back shroud 50. The front shroud 28 is slightly spaced from the outer edges of the blades 24 and 26, and in combination with the hub 22 defines an axially facing annular impeller inlet 30 and radially outward facing impeller outlet 32. Upstream of the inlet 30 is an annular inlet plenum 31.

Circumscribing the outlet 32 are an outer annular wall 34 and a inner annular wall 36. The walls 34 and 36 are axially spaced apart and define an annular diffuser 38 which extends to the combustor 80. A plurality of circumferentially spaced diffuser vanes 39 are disposed within the diffuser 38 between the walls 34 and 36. At its radially outer end, the front shroud 28 has a curved portion 27 that is opposite the outer annular wall 34 to define an annular channel 25 therebetween. The front and back shrouds 28, 50, and the inner and outer walls 34, 36 are coupled to a diffuser housing 40 by bolts 41.

The diffuser housing 40 is comprised of an annular, axially facing U-shaped portion 42 having a length-to-height ratio of about 2 to 1. The U-shaped portion 42 is welded to, or attached by any other means, to an arcuate portion 46. The arcuate portion 46 defines a annular channel 48. The channel 48 should be made as deep as available space permits without affecting the structural integrity of the arcuate portion 46. At its downstream end the arcuate portion 46 is bolted to a combustor housing 82. The U-shaped portion 42 is made from a material, such as Inconel 625, having a larger elongation property than the material, such as Inconel 718, from which the arcuate portion 46 is made.

The back surface of the inner wall 36 has an annular slot 37. At its radial outer end the back shroud 50 has two radial spaced apart annular rims 52, 54 which are inserted into the slot 37. The outer of these rims 52, referred to as a pilot, contacts the surface of the slot 37 and is used to position the back shroud 50 within the engine 10. A 0.020 inch gap separates the inner 54 from the surface of the slot 37. Preferably, the rim 54 should be twice as thick as rim 52. Alternatively, the rims 52 and 54 can be combined in a single rim. Moving inwards from the rim 54, the back shroud 50 has a slightly concave middle portion 56. The middle portion is contoured to match the curvature and shape of the back surface 23 of the hub 22. At its radially inner end 58, the back shroud 50 has a plurality of rounded grooves 60. Attached to the inner end 58 is a structure 62 having an end 64 placed within 0.25 inches of the turbine wheel 94. The end 64 should be as close as possible, without touching, to the turbine wheel 94, but at least within 0.50 inches of the turbine wheel. The structure 62 is referred to as a bumper because during a hub burst it contacts the turbine wheel 94 preventing the back shroud 50 from deflecting away from the hub 22. In the preferred embodiment, the bumper 62 is part of the labyrinth seal 92 but has a thickness at least twice that of conventional seals. Alternatively, the bumper 62 may be any structure disposed between the back shroud 50 and the turbine wheel 94 that limits the deflection of the back shroud during a hub burst.

In the event of such a burst, high energy fragments are channeled to the diffuser by the front and back shrouds 28, 50. The back shroud has a number of novel features which act to contain these fragments. The grooves 60 create resistance for the fragments as they slide along the surface of the shroud, and also grind off portions of the curvic coupling 96 which because of their sharpness are very damaging. The middle portion 56, due to its shape, also creates resistance for the fragments and may even trap some of them. The force generated by the burst pushes the wall 36 into contact with the rim 54 which absorbs some of this energy and delays the shearing of the bolts 41.

The diffuser housing 40 also has a number of novel features designed to contain these high energy fragments, Fragments are caught by the channel 48 and swirl around within the channel. The channel also prevents these fragments from entering the combustor where the casings are usually thinner. Under the force of the burst, the U-shaped portion 42 stretches and deforms axially thereby preventing the breaking or tearing of the diffuser housing 40, The U-shaped portion 42 also traps some of the fragments.

The combination of back shroud 50 and diffuser housing 40 results in a containment system that can contain the high energy fragments associated with a hub burst. By containing these fragments damage to the aircraft is avoided and flight safety is not jeopardized.

Various modifications and alterations to the above described embodiment will be apparent to those skilled in the art. Accordingly, this description of the invention should be considered exemplary in nature and not as limiting to the scope and Spirit of the invention as set forth in the following claims.

What is claimed is:

1. A gas turbine engine comprising:

a turbine mounted to a shaft;

a combustor in fluid communication with said turbine;

an impeller mounted to said shaft and having an axial inlet and a radial outlet, said impeller being disposed between an annular front shroud and an annular back shroud;

a first and second annular wall circumscribing said radial outlet, said walls spaced apart axially to define therebetween a diffuser, a housing circumscribing said annular walls and said shrouds; and said second annular wall having an annular slot for receiving an annular rim extending from said back shroud.

2. The gas turbine engine of claim 1 wherein said annular slot receives two radially spaced apart annular rims extending from said back shroud.

3. The gas turbine engine of claim 2 wherein only one of said rims contacts the surface of said slot.

4. The gas turbine engine of claim 1 further including a bumper having a first axial end contacting said back shroud and having a second axial end axially spaced apart from a portion of said turbine.

5. The gas turbine engine of claim 4 wherein said back shroud has a shape contoured to the shape of the back surface of said impeller.

6. The gas turbine engine of claim 5 wherein said back shroud has a plurality of grooves at its radially inner end.

* * * * *